UNITED STATES PATENT OFFICE 2,108,305

PROCESS FOR CURING AND PRESERVING PLANT PRODUCTS

Mayne R. Coe, Washington, D. C., assignor to the Government and the People of the United States of America No Drawing. Original application December 9, 1933, Serial No. 701,733. Divided and this application September 24, 1936, Serial No. 102,351

6 Claims. (Cl. 99—8)

(Granted under the act of March 3, 1883, as amended April 30, 1928; 370 O. G. 757)

This application is a division of my application for patent which bears Serial No. 701,733, filed December 9, 1933, covering a process for curing and preserving plant products.

This application is made under the act of March 3, 1883, as amended by the act of April 30, 1928, and the invention herein described, if patented, may be manufactured and used by or for the Government for governmental purposes without the payment to me of any royalty thereon.

The object of my invention is to proviode a method and means of curing and preserving plant products or plant foliage products such as tobacco, hops, hay and alfalfa, sage, thyme, catnip, mint and other herbs, so that the product may possess a superior flavor and aroma and further that these products may retain such flavor and aroma until used. It is found that these plant products after being cured and prepared for use by their usual processes, suffer a loss of flavor and aroma upon exposure to ordinary light or sunlight. This is particularly noticeable in the case of tobacco after it has been prepared for market in the form of smoking and chewing tobacco or as cigarettes and cigars.

I have found however, that not all light rays are harmful to these air cured plant products, and that the harmful wave lengths of light are below 4900 Angstrom units of the spectrum. Specifically it is found that exposure of these foliage plant products to ultra-violet, violet and blue wave lengths of light results in a loss by the products of mildness, flavor and aroma. Tobacco in its various forms exposed to ordinary light, which includes ultra-violet, violet and blue light rays acquires a rank smoking quality and suffers a loss of that pleasing aroma and mildness so prized by the users of tobacco.

While it is found that the light rays specified above lying below 4900 Angstrom units of the spectrum are definitely harmful to cured plant products such as tobacco, wave lengths of light above 4900 Angstrom units of the spectrum, when admitted to the products have a decidedly beneficial effect in that the desirable flavor and aroma are enhanced or retained.

It is further found, however, that the wave lengths of light above 4900 Angstrom units of the spectrum vary in respect to their preservative quality in the particular above disclosed. It is found, for example, that chlorophyll green rays of light may be admitted to the product with extremely beneficial results. Smoking tobacco, cigarettes and cigars protected for a period of fifteen days by a transparent or translucent chlorophyll green screen or wrapper were mild in smoking quality, possessed a fragrant tobacco aroma and were very pleasing to the smoker, while products of like quality exposed to ordinary light for the same period, as compared to the tobacco product protected by the chlorophyll green wrapper, had acquired a rank smoking quality and suffered a loss of pleasing arorr Both lots of tobacco products used in this test were protected from moisture.

The use of a chlorophyll green wrapper or screen in the respect disclosed above is found to be the most helpful of the colors above 4900 Angstrom units of the spectrum. Orange yellow wrappers are next in order of beneficial results. The other wave lengths of light above 4900 Angstrom units of the spectrum also have a preservative effect on the products but are not as valuable in this respect as are the chloropryll green and orange-yellow wrappers.

That which has been said above in relation to tobacco products, is equally true of the other foliage plant products mentioned above. Such products if protected from ultra-violet, violet and blue light rays and exposed to chlorophyll green or orange-yellow wave lengths of light during the curing period and/or until used by the consumer, acquire and retain a noticeably superior flavor and aroma.

Air curing of such products may be done under the influence of the particular protective light rays disclosed by admitting only those helpful rays to the products. Hay and alfalfa may be cured under transparent or translucent chlorophyll green hay-caps with very beneficial results. Tobacco may be cured in barns which admit only chlorophyll green rays of light and thereafter the tobacco products should be enclosed in transparent or translucent chlorophyll green or orange-yellow wrappers or containers which, in addition to their preservative effectiveness, possess an attractive appearance.

All rays of light, including the harmful ultra-violet, violet and blue rays, may be excluded by enclosing the tobacco or other air cured plant product in opaque containers with beneficial results, but the packaged product is not as attractive from a sales point of view.

A particularly attractive, protective and efficient cigarette or cigar package may be formed by wrapping or enclosing the cigarettes or cigars in a chlorophyll green or orange-yellow transparent or translucent wrapper or container, the ends of which have an inner layer or lining of binder material, such as one of the foils. This binder material or foil associated with the ends of the wrapper serves to hold the folded or closing portion or the twisted ends (in the case of a single cigar) of the protecting color screen in a closed position. The binder material or foil may be secured to the ends of the colored wrapper and extend beyond the wrapper. In this form, the binder material must be opaque, and alone serves as a closing medium. The opaque binder material excludes all harmful light from the tobacco at the ends of the package.

By chlorophyll green is meant the green pigment in the plant kingdom having a spectral transmission beginning with 5270 to and including 6500 Angstrom units of the visible spectrum.

By orange-yellow is meant that shade of yellow which excludes or absorbs that portion of the spectrum lying below 5000 Angstrom units of the spectrum.

Having fully disclosed my invention, I claim:

1. In the process of air curing hops, the step which comprises admitting during such curing and thereafter only those wave lengths of light lying above 4900 Angstrom units of the spectrum.

2. In the process of air curing plant foliage for human consumption, the step which comprises admitting to the plant foliage only those wave lengths of light lying above 4900 Angstrom units of the spectrum.

3. In the process of curing plant foliage for human consumption, the step which comprises protecting the plant foliage from harmful light with a color screen having a spectral transmission only of 5270 to and including 6500 Angstrom units of the spectrum during the curing period and thereafter.

4. In the preparation and packaging of air cured plant products for use, the act of admitting to such products during the curing period only wave lengths of light above 4900 Angstrom units of the spectrum, and thereafter inclosing the cured products in containers which admit only light above 4900 Angstrom units of the spectrum.

5. The process of curing air cured plant products, which comprises exposing such products to the influence of light above 4900 Angstrom units of the spectrum only.

6. The process of curing air cured plant products, which comprises inclosing them in containers having a spectral transmission of above 4900 Angstrom units of the spectrum only and exposing the inclosed products to such spectral transmission.

MAYNE R. COE.

CERTIFICATE OF CORRECTION.

Patent No. 2,108,305.　　　　　　　　　　　February 15, 1938.

MAYNE R. COE.

It is hereby certified that the above numbered patent was erroneously issued to the Government and the People of the United States of America, as assignee, whereas said patent should have been issued to the inventor, said Mayne R. Coe, of Washington, District of Columbia, as shown by the record of assignments in this office; and that the said Letters Patent should be read with this correction therein that the same may conform to the record of the case in the Patent Office.

Signed and sealed this 5th day of April, A. D. 1938.

Henry Van Arsdale,
(Seal)　　　　　　　　　　　Acting Commissioner of Patents.